Figure 1:
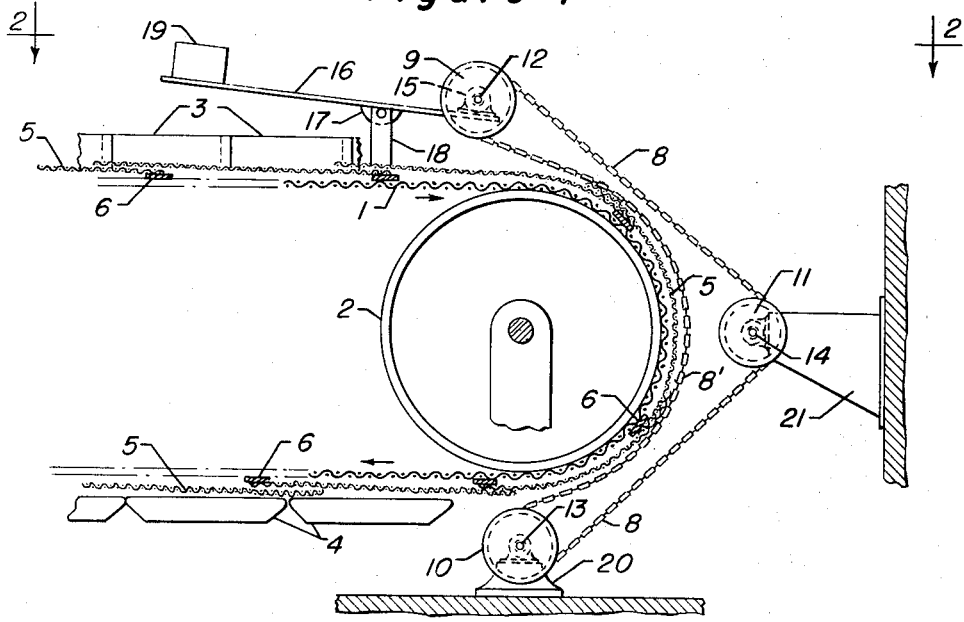

Dec. 5, 1967  W. C. HENSEL  3,356,207
WOVEN CONVEYOR BELT SYSTEM HAVING A FINE MESH OVERLAY
Filed June 23, 1966

INVENTOR:
Walter C. Hensel

BY:
ATTORNEYS

United States Patent Office 3,356,207
Patented Dec. 5, 1967

3,356,207
WOVEN CONVEYOR BELT SYSTEM HAVING A FINE MESH OVERLAY
Walter C. Hensel, Palatine, Ill., assignor to Universal Oil Products Company, Des Plaines, Ill., a corporation of Delaware
Filed June 23, 1966, Ser. No. 559,798
3 Claims. (Cl. 198—193)

The present invention relates to a conveyor belt system providing for a fine mesh overlay, and more particularly to a woven metal carrying belt and fine screen overlay arrangement which can be utilized to carry finely divided material through a treating zone, drying oven, or the like.

Where powders, finely divided catalysts or other subdivided particulates are to be conveyed on perforate belt means so that heated air or other gaseous stream can contact a continuously moving layer of material, as for example in drying ovens or in calcining zones, there are various support and expansion problems encountered in designing and operating any given system. A fine mesh screen or wire cloth of course does not have sufficient strength to serve as the entire load carrying belt means over driven end idler rollers. Thus, it is generally necessary to superpose a fine mesh screening over a more conventional heavy woven belt conveyor system. Also, it is not practicable to utilize a continuous loop of fine screening over a woven metal conveyor belt, particularly with high temperature conditions required in connection with drying oven conveyor means which would result in buckling and lack of a good smooth contact between the adjacent portions of the overlay screen and the carrying belt.

It is thus a principal object of the present invention to utilize a fine mesh overlay arrangement where there are a plurality of fine mesh sections positioned over and attached in shingle-fashion to a conventional form of woven metal belt.

It is also an object of the present invention to provide a novel arrangement of spaced loops of chains or other belt means that carry around the discharge end of the conveyor belt such that the loose or unattached end portions of the fine screen overlay sections will not fall away from the load carrying conveyor and in turn not flop loosely around the end of the conveyor belt unit. In other words, the sectionalized overlay screens will instead be held in alignment and in good contact with the top face of the conveyor belt as the latter goes over the end of the unit to reverse direction and travel underneath the roller means. This hold-down action is preferably initiated at the beginning of the curved portion of the conveyor belt as it descends over the end pulley such that no conveyed material will be allowed to fall under a loose end of an overlay screen section.

In a broad aspect, the present invention provides a woven metal conveyor belt apparatus with a fine screen overlay arrangement to be used at high temperature conditions, which comprises in combination, spaced idler and drive pulley means, a flexible continuous loop form of woven metal conveyor belt extending over said pulley means and adapted to support material for conveyance in an elongated path, a plurality of fine mesh screen overlay sections positioned over and attached shingle-fashion to said conveyor belt, and a plurality of transversely spaced hold-down belt members encompassing the discharge end portion of the conveyor belt and the overlay sections, each of said hold-down belt members being continuous loops maintained in separate spaced vertical planes normal to said conveyor belt by extending around accompanying spaced idler pulley members, the latter being positioned and arranged on shaft means to hold a portion of each of such belt members in an arc-like manner around and against said overlay sections, whereby the free ends of the latter are held in a guided position as they descend down around the pulley means for the conveyor belt at the discharge end thereof.

Generally, the woven metal conveyor belt may be of a conventional design or type such as used in drying ovens or other high temperature treating zones; however, the type of metal used in forming the conveyor belt may vary to suit particular temperature conditions or particular corrosion problems. Also, where fine material is to be carried through a treating zone, then conventional sectionalized solid side construction may be incorporated with the conveyor belt means. Generally, the fine mesh screening or wire cloth which is utilized in combination with the carrying belt shall have a particular mesh size to coordinate with the size of particulates being carried on the belt means to preclude loss of particles down through the conveyor system, and it is not intended to limit the present construction to any one mesh size. The fine screening may be of the order of the 40 to 80 mesh range, or even finer where it is necessitated for a particular material to be conveyed. Preferably, the overlapping sections of fine mesh screen will have the leading edge attached to the metal conveyor belt with a welding type of construction, although other attachment means may be employed and, again, it is not intended to limit the present invention to any one method of attaching the edge of the fine screen to the belt. In utilizing a spot welding attachment, it has been found desirable to make use of a thin metal strip transversely on top of the conveyor belt and below the edge of the fine mesh screen, as well as making use of overlaying thin discs or small pieces of metal at the spot weld zones. Thus, in effecting the spot welding operation there is less chance of entirely burning out the fine mesh screen material and insuring the obtainment of a good bond with the heavier carrying belt.

In connection with the novel arrangement of using transversely spaced chain or other belt means at the end of the conveyor unit, in order to hold the sectionalized overlay screens in contact with the conveyor belt, there may be varying spacings and pulley arrangements. Such spacings depending primarily upon the width of the conveyor belt and the size and nature of the particular overlay screens. Preferably, the pulley arrangements positioning the hold-down chain loops or belt members should be such that they, in effect, overlap the end of the conveyor belt means and maintain pressure against the descending overlay sections that is sufficient to hold them in substantial contact with the conveyor belt surface. As hereinbefore noted, this will prevent the falling away of the overlay screens and, also, preclude conveyed material from getting under the loose end portion of an upstream overlay section.

Reference to the accompanying drawing and the following description thereof will serve to better illustrate one embodiment of the improved invention where there is provided an overlay screen ararngement and holding means with respect to a perforate woven conveyor belt apparatus operating under high temperature conditions.

Figure 2:
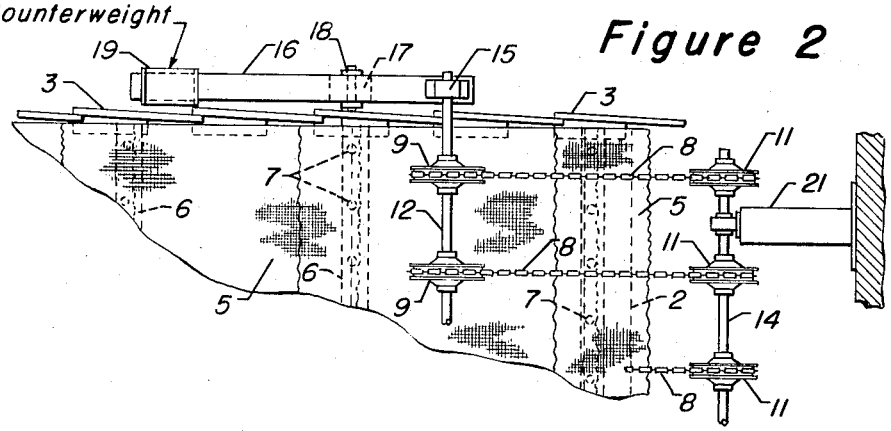

FIGURE 1 of the drawing is a partial sectional elevational view of the end of a woven metal conveyor unit having a plurality of fine mesh overlay sections and one arrangement of a continuous loop "hold-down" chain system operating in combination therewith. FIGURE 2 of the drawing is a partial sectional plan view, as indicated by the line 2—2 in FIGURE 1, showing the transverse spacing of a plurality of hold-down loop chain means which are positioned in spaced vertical planes to contact and move with the end portion of the conveyor belt unit.

Figure 3:
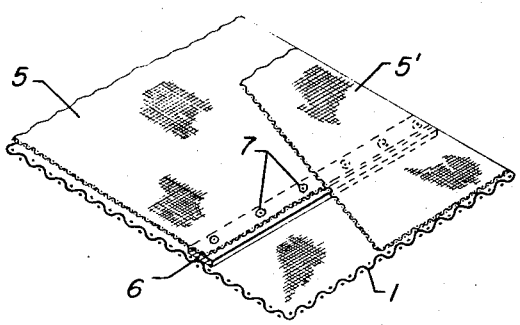

FIGURE 3 of the drawing is a diagrammatic view indicating one means of attaching and overlapping the fine mesh screen overlay sections to a heavy woven wire conveyor belt such that there is a resulting perforate carrying system suitable for finely divided particulates.

Referring now particularly to FIGURES 1 and 2 of the drawing, there is indicated a heavy woven wire conveyor belt 1 adapted to pass around a drive roller 2 and carry back underneath the latter to an idler roller not being shown in the drawing. The woven conveyor belt 1 may have conventional sectionalized solid side portions 3 which are normally utilized in connection with the conveyance of finely divided material through drying ovens and the like. The underneath portion of the conveyor belt system may also be provided with Micarta faced steel members or shoes 4 which are also conventional with conveyor belt means to support the latter as it is returned to the upstream end of the unit.

In accordance with the present invention, where it is desired to carry powders or other finely divided particulates on conventional forms of woven metal belts, there is indicated a plurality of fine mesh screen sections 5 which are shown as having their upstream or leading edges attached through metal strip means 6 to the conveyor belt 1. The downstream end portions of each of the fine mesh overlay sections 5 are indicated as providing a substantial overlap with respect to the next adjacent fine mesh section, as well as provide a covering over metal disc members used to effect a spot welded attachment of the leading edge of such next screen section. Thus, there is insured adequate coverage or overlay for the conveyor belt to preclude the loss of finely divided material therethrough as such material is carried through a high temperature treating zone. Generally, in a drying oven, or in an oxidizing zone and the like, there will be a current of high temperature air or heated treating gas to effect passageway upwardly through a partially open woven belt construction and the particulates being carried to the discharge end of the conveyor system. However, in order to simplify the present diagrammatic drawing, no particulates have been indicated in any of the views.

As best shown in FIGURE 3 of the drawing, there is indicated the use of a transverse metal strip 6 over the top of the heavy woven metal conveyor belt 1, with such strip being underneath the leading edge of an overlay section 5. Generally, the overlay sections will be "spot" or resistance welded at spaced points along this leading edge through the strip 6 and through the conveyor belt 1. However, in order to preclude excessive burning of the fine mesh overlay 5 and to obtain a strong weld, it is generally preferable to utilize a plurality of spaced metal discs or slugs 7 on top of the edge of the screen 5, having one for each spot welding zone. The thickness of the discs 7 and the strips 6, as well as their particular alloy compositions shall be compatible with the nature of the treating temperature and conditions to be encountered in the conveyor zone, as well as with the resistance welding operation, such that there is a resulting strong and serviceable attachment of each leading edge of each overlay section 5 to the conveyor belt 1. In FIGURE 3, 5' indicates a "downstream" overlap portion of an adjacent fine mesh section 5. As previously noted, there shall be sufficient overlay in all cases to insure an adequate coverage of the belt 1 in a shingle-like method of attachment for the plurality of sections, which shall, of course, extend completely around the entire periphery of the continuous loop conveyor belt 1.

Referring again more particularly to FIGURES 1 and 2, there is shown the use of a plurality of spaced continuous chain sections 8 extending over spaced apart idler pulleys 9, 10 and 11. The pulleys 9 are shown mounted on a transverse shaft member 12, the pulley members 10 on a transverse shaft 13, and pulley members 11 on a shaft 14. The shafts are in turn mounted in an arrangement such that a portion 8' of the chain loop 8 is maintained in direct arcuate contact with the end of the conveyor belt unit. In other words, the pulleys 9 on the shaft 12 and the pulleys 10 on shaft 13 will overlap the end portion of the conveyor belt unit sufficiently to maintain an arcuate section 8' of the chain in frictional contact with the overlay sections 5 at this end portion of the conveyor belt unit, where the carrier belt 1 and attached sections 5 leave the top portion of the unit to carry around drum 2 and reverse direction. FIGURE 2 of the drawing indicates the shaft 12 for pulleys 9 as being supported from suitable bearing means 15 in turn held on a counter weight arm 16 at the side of the conveyor belt unit. A fixed position fulcrum point or bearing 17, on support 18, holds the arm 16 while at the opposing end of the latter is a movable or adjustable counterweight member 19. The shaft 13 and pulleys 10 are positioned under an end portion of the unit from support means 20 so as to provide the desired "hold-down" arrangement of the lower end of the chain belt section 8'. The shaft 14 is shown supported from suitable bracket means 21. The transverse spacing of the sets of pulleys and between loops 8 may be of the order of 6" to 8", or whatever may be deemed necessary in order to maintain the desired frictional contact with each of the loose end portions of sections 5 and adequate holding thereof against the upper surface of the next adjacent section to thus preclude the flopping of loose end portions as they carry around the end of the conveyor system. It is not intended to limit the hold-down means 8 to any one type of chain or belt means. A flat chain material, such as sash chain, operates quite satisfactorily; however, other types of belts, including rubberized woven material can be used provided they are flexible and will engage the screening and pulleys without slipping. Actually, they should move in unison and preclude any scraping on the fine mesh screen. In other words, the chain means 8 will move in the direction of the arrows, as shown in FIGURE 1, at a continuous frictionally driven speed from the corresponding movement of the conveyor belt 1 and the overlay sections 5, with none of the supporting pulleys being power driven. For a drying oven, the spaced loops 8 may comprise light weight chain of a material capable of withstanding the temperature conditions involved and, in addition, will generally be formed of small link smooth link material which will cause a minimum wear on the face of the overlay screen sections 5. Where chain stock is used, it may be of a single loop type, double loop type, twist link type, or of the sash link type. As hereinbefore noted, suitable flexible belts or cable means may also adequately serve to hold down the sectionalized overlay screening although, generally, it is believed that a small link, such as provided with sash chain, will better serve to in turn provide the tight arcuate arrangement for holding down the overlay sections at the end of the conveyor unit. In order to maintain adequate tension on the loops 8, the present drawing indicates diagrammatically the use of counterweight means connective with the shaft 12 which in turn supports the pulleys 9; however, the counterweight means could well be connected to a different one of the shafts holding pulleys for the loops 8. Alternatively, a tension spring arrangement may be used in connection with any one of the shafts in lieu of the counterweight means whereby there is the desired adequate constant tensioning of the loop sections 8 and the desired holding down of each of the sections 5 to the surface of conveyor belt 1 at the discharge end of the unit.

I claim as my invention:

1. Woven metal conveyor belt apparatus with a fine screen overlay arrangement, which comprises in combination, spaced idler and drive pulley means, a flexible continuous loop woven metal conveyor belt extending over said pulley means and adapted to support material for conveyance in an elongated path, a plurality of fine mesh screen overlay sections positioned over and attached shingle-fashion to said conveyor belt, and a plurality of transversely spaced hold-down belt members encompassing the discharge end portion of the conveyor belt and the overlay sections, each of said hold-down belt members being continuous loops maintained in separate spaced vertical planes normal to said conveyor belt and extending around accompanying vertically spaced idler pulley members, with the latter being positioned and arranged to hold a portion of such belt members in an arc like manner around and against said overlay sections, whereby the free ends of the latter are held in a guided position as they descend down around the end pulley means for the conveyor belt.

2. The conveyor belt apparatus of claim 1 further characterized in that each of said overlay sections have only their leading transverse edge portions attached to the conveyor belt, and such attachment incorporates a thin transverse strip between the edge of each fine mesh section and the heavy woven metal belt together with at least spaced thin metal slug sections for the top of said fine mesh sections, whereby there may be accommodated resistance welding from top to bottom in the attachment.

3. The conveyor belt apparatus of claim 1 further characterized in that said spaced belt members arranged to hold down the overlay sections at the discharge end of the conveyor belt apparatus are provided of relatively small link flexible chain, whereby the friction between such belt members and the overlay sections will readily permit the chain to move with the latter and preclude frictional wear on the screening.

References Cited

UNITED STATES PATENTS

| | | | |
|---|---|---|---|
| 1,331,460 | 2/1920 | Morrison | 198—165 X |
| 1,438,566 | 12/1922 | Wiggins | 198—193 |
| 3,100,564 | 8/1963 | Levy | 198—165 |

GERALD M. FORLENZA, *Primary Examiner.*

R. J. HICKEY, *Assistant Examiner.*